United States Patent

[11] 3,593,701

| [72] | Inventor | Bertram L. Youmans |
| | | 8544 Rascher Ave., Chicago, Ill. 60656 |
| [21] | Appl. No. | 855,977 |
| [22] | Filed | Sept. 8, 1969 |
| [45] | Patented | July 20, 1971 |

[54] COLLAPSIBLE BARBECUE GRILL
6 Claims, 9 Drawing Figs.

[52] U.S. Cl. .................................................. 126/25 A, 126/9 R
[51] Int. Cl. .................................................. A47j 37/00, F24b 3/00, F24c 1/16
[50] Field of Search ........................................ 126/9, 25, 25 A, 30

[56] References Cited
UNITED STATES PATENTS

| 1,258,040 | 3/1918 | Peaslee | 126/30 UX |
| 1,551,198 | 8/1925 | Lorton | 126/30 UX |
| 2,974,662 | 3/1961 | Forrest | 126/30 |
| 2,998,002 | 8/1961 | Standig | 126/25 A |
| 3,176,676 | 4/1965 | Caldwell | 126/9 X |

Primary Examiner—Charles J. Myhre
Attorney—Johnston, Root, O'Keeffe, Keil, Thompson & Shurtleff

ABSTRACT: Collapsible and portable barbecue grills embodying a center post structure with a vertically adjustable grill composed of vertically pivotable radial arms and a collapsible fire pan composed of vertically pivotable arms supporting a flexible, heat-resistant material, e.g., asbestos cloth, forming the fire pan when open, and springable wire support legs slidable in the hollow post into a collapsed position.

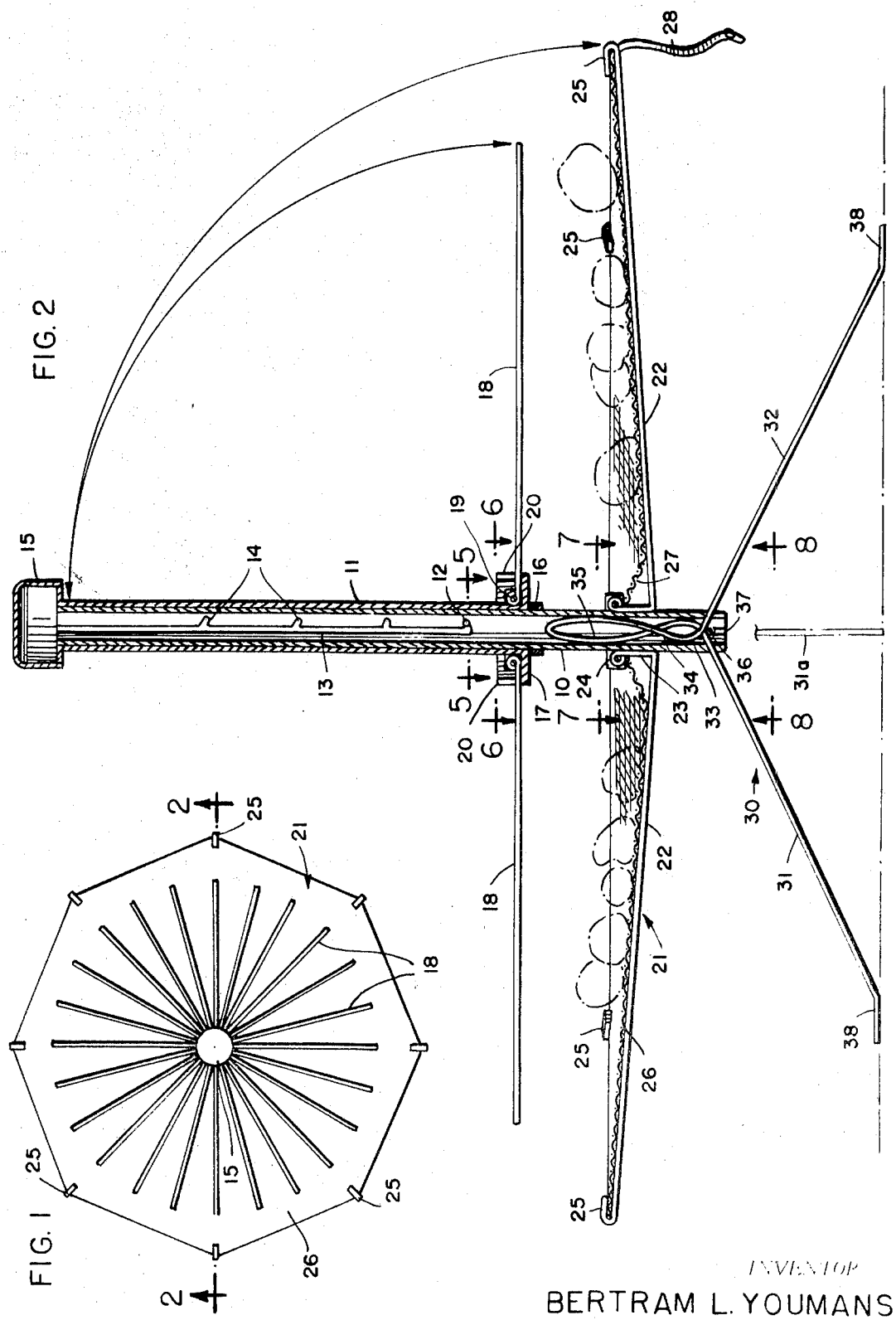

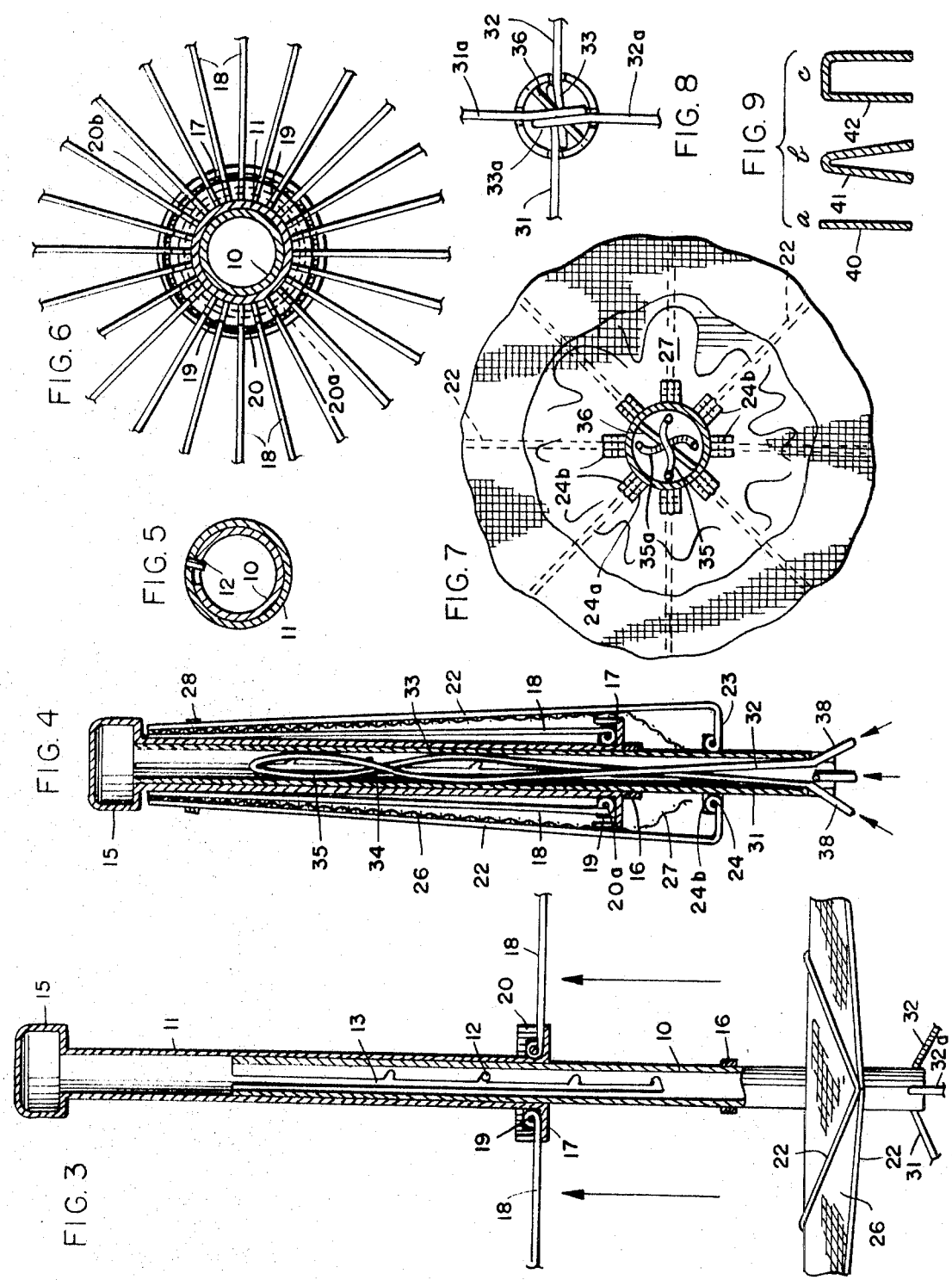

3,593,701

COLLAPSIBLE BARBECUE GRILL

INTRODUCTION

The invention herein concerns improvements in portable barbecue grills. These grills fill a need for a barbecue grill which is easily transportable to a picnic or other site and which collapses into a compact unit for transporting and storing same. Some efforts have been made in this direction and the subject invention constitutes improvements thereover. For example, Standig U.S. Pat. No. 2,998,002 discloses a collapsible bowllike barbecue grill wherein the bowllike structure is made of wedge-shaped segments. In the collapsed state, they rest in superposed relationship. Manley et al. U.S. Pat. No. 3,045,660 shows a portable grill with a pair of grill members pivotally mounted on a post between horizontal and vertical positions to make the unit flatter during storage and transportation.

BRIEF DESCRIPTION OF THE INVENTION

The subject invention concerns improvements in collapsible barbecue grills which depart in structure significantly from the proposals heretofore. The main support structure of the barbecue grills is a center post, preferably a tubular post, composed of two telescopic sections. The outer, upper, telescoping section carries the collapsible barbecue grill which is composed of a series of closely spaced radial rods or bars hinged to the outer post member at the base of the rods for pivotal movement between a substantially horizontal, in-use position and a vertically oriented, collapsed position with the rods lying substantially flat against the outer post member. The inner, lower post is telescoped in the outer post with means being provided to set these posts in various degrees of telescoping for the purpose of raising and lowering the grill relative to the fire pan. The fire pan is mounted on the lower post member and also may be collapsed. Its essential components comprise a plurality of radially extending rods, bars or arms hinged at their radial inner ends to the lower post section. A flexible, heat-resistant sheet such as asbestos cloth rests on these arms and forms the fire pan. The peripheral edge of the sheet preferably is fixedly secured to the radial outer ends of the arms. The arms are pivotable between a nearly horizontal, in-use position and a vertically oriented, collapsed position. The arms and the asbestos cloth in the collapsed position lie about the aforesaid radial grill rods.

The barbecue grill may be supported on any suitable support means, preferably one which is either per se compact in nature or one which can collapse. In the preferred form the support structure for the barbecue grill comprises heavy wire legs or rods adapted to slide into the hollow lower post section in the collapsed position and to extend radially downwardly therefrom in the in-use position. This may be done conveniently by means of two pairs of wires, each having diametrically oppositely extending legs and an interconnecting bent bight portion seated in and supported within the lower end of the hollow post.

DESCRIPTION OF THE DRAWINGS

Preferred embodiments of the invention are illustrated in the drawings wherein:

FIG. 1 is a top plan view of a preferred embodiment;

FIG. 2 is a vertical section of the embodiment of FIG. 1 with the grill in its lowest position relative to the fire pan;

FIG. 3 is a similar vertical section, in fragment, with the grill raised relative to the fire pan to an intermediate position;

FIG. 4 is a vertical section of the grill of FIG. 1 in the collapsed state;

FIG. 5 is a transverse section taken on section plane 5—5 of FIG. 2;

FIG. 6 is a transverse section taken on section plane 6—6 of FIG. 2;

FIG. 7 is a transverse section taken on section plane 7—7 of FIG. 2;

FIG. 8 is a bottom plan view, with the support legs in fragment, of the lower post section and the base loops of the spring wire legs positioned therein; and FIGS. 9a, 9b and 9c are transverse sections of various alternative forms or shapes for the radial grill rods and/or the radial arms of the fire pan.

DESCRIPTION OF THE PREFERRED EMBODIMENT

Referring to the drawings, the collapsible barbecue grill has a center post composed of a tubular lower section 10 telescoped into a tubular, outer, upper section 11. The tubular section 11 has a pin 12 extending inwardly. This pin rides in a vertical slot 13 in the tubular section 10 and may be seated in any one of the notches 14 for adjusting and positioning the telescopic relationship between the two tubular sections. The outer tubular section 11 carries at its upper end a hollow, heatproof handle or cap 15.

The lower tubular section 10 has fixedly mounted thereon a stationary ring 16 which serves as a stop or support for the grill arm support ring 17. The ring 17 has a plurality of closely spaced, radially extending, vertically pivotable rods or arms 18 mounted thereon. These rods have at their radial inner ends eyes or apertures 19 which receive and rotate on a hinge pin or rod. Such hinge pin or rod may be a ring 20a which extends through circumferentially spaced inner ears 20b carried on the radially inner periphery of the ring 17. In the extended, horizontal position the rods or arms 18 fit between spacer ears 20 extending upwardly from the peripheral outer edge of the ring 17. The rods or arms 18 are thus adapted to lie in their extended position in a substantially horizontal plane (FIGS. 1 and 2) and provide a grill upon which food items may be laid for heating and cooking same. When the barbecue grill is collapsed, the rods or arms 18 are pivoted upwardly into substantially vertical orientation and lie nearly flat against the center post to provide a compact assembly for storage and handling (FIG. 4).

The fire pan 21 is similarly collapsible. It is composed of a series of radially extending rods or arms 22, each having an angulated base segment 23 adapted to lie flat against the lower tube section when the fire pan is in the extended, in-use position. These base segments have eyes or apertures 24 which are pivotally mounted on pivot pins 24a mounted in the trunnions 24b, the latter in turn being fixedly attached to the lower tubular section 10. The radially outer ends of the arms 25 are preferably bent over to grip the asbestos cloth or other flexible, heat-resistant material forming the fire pan 26 at spaced points about the periphery thereof. Its central portion 27 has an aperture loosely positioned about the post section 10 and preferably is gathered.

The fire pan 21 is collapsed by raising the arms or rods 21 to a position wherein the arms or rods and the asbestos cloth are in substantially vertical orientation and envelop the radial grill rods or arms 18 (FIG. 4). A tie ribbon or strap 28 is secured about the upper end of the arms or rods 22 and the cloth 26 to hold the latter in the collapsed position.

In the extended position of the grill rods and the fire pan, the fire pan preferably has a dishlike configuration as shown in FIG. 2 and thus forms a shallow receptacle to hold the fuel, e.g., charcoal briquets or the like. The grill portion may be raised or lowered by grasping the handle or cap 15 and sliding the pin 12 in the vertical slot 13 until the pin is seated in the desired slot 14.

The portable barbecue grill may be supported on any suitable support structure, preferably one which is either compact or one which is collapsible from its extended position. One type of support embodies a pointed end on the lower side of the lower tube section 10, the pointed end adapted to be pressed into the earth a sufficient depth to give a firm support (not shown). A preferred support, however, comprises laterally and downwardly directed leg structure 30 composed of four legs 31, 32, 31a and 32a. These legs preferably are flexible heavy wire or rods formed from a pair of wires or rods. The leg pairs 31 and 32 are made from a single wire or rod bent to provide the diagonally extending legs 31 and 32 when the latter are in the extended position. These legs cross at the apex thereof and are bent into a loop 33. They again cross at 34 and are bent into an upper loop 35. The loops 33 and 35 are positioned within the lower tube section 10 and preferably resiliently engage the inner wall thereof. The apex of the legs 31 and 32 is above a cross rod 36 fixed in the lower end of the tube section 10 to limit the downward movement of the rod or wire in the fully extended position of the legs 31 and 32. These legs in the extended position preferably extend through slots 37 in the lower end of the tube section 10 to give lateral stability and proper positioning of the extended legs.

The other pair of legs are formed from a rod or wire in a fashion similar to that previously described for legs 31 and 32. The loops 33a and 35a (FIGS. 7 and 8) are interlooped into the loops 33 and 35 in planes substantially at right angles to each other. The radially outer or lower ends of the respective legs preferably have feet segments 38 adapted to lie substantially horizontal when the legs are in the extended position. In the collapsed position of the barbecue grill (FIG. 4), the legs are simply pushed upwardly into the inner tube section 10.

In lieu of rods or heavy wire structures for the arms 18 and 22, other shapes may be used as shown in FIGS. 9a, b and c. One shape is a flat bar 40, another is an inverted V-shaped bar 41 and another is an inverted U-shaped bar 42. Such bar structures give greater strength against vertical bending than do rods or wires.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention I hereby claim is as follows:

1. A portable barbecue structure comprising a center post, a grill composed of a plurality of closely spaced radial arms pivotally mounted on said center post, said arms being pivotable between an extended position in a substantially horizontal plane and a collapsed position wherein said rods are in substantially vertical orientation and closely nested about said post, and a fire pan mounted on said post below said arms, said fire pan comprising a plurality of radial arms pivotally mounted on said post, a flexible, heat-resistant sheet mounted on and supported by said arms, and said arms being pivotable between a substantially horizontal orientation in the extended position and a substantially vertical orientation about said post in the collapsed position.

2. A portable barbecue structure as claimed in claim 1 wherein said fire pan in the collapsed position envelops said radial arms of said grill.

3. A portable barbecue structure as claimed in claim 1 wherein said post is composed of two telescoping tubes, said grill being mounted on the upper and outer tube, and means for adjusting the degree of telescoping of said tubes to raise or lower said grill relative to said fire pan.

4. A portable barbecue structure comprising a hollow center post, a grill composed of a plurality of closely spaced radial arms pivotally mounted on said center post, said arms being pivotable between an extended position in a substantially horizontal plane and a collapsed position wherein said rods are in substantially vertical orientation and closely nested about said post, and a plurality of legs extending outwardly and downwardly from the lower end of said post in the extended position of said legs, and means slidably mounted in said hollow post and connected to said legs to permit said legs to be housed within said post to compactly store same within the barbecue structure.

5. A portable barbecue structure comprising a center post having a collapsible fire pan mounted thereon, said fire pan comprising a plurality of radial arms pivotally mounted on said post, a flexible heat-resistant sheet mounted on and supported by said arms, and said arms being pivotable between a substantially horizontal orientation in the extended position and a substantially vertical orientation about said post in the collapsed position.

6. A portable barbecue structure as claimed in claim 5 wherein said post is composed of two telescoping tubes, a grill being mounted on the upper and outer tube, and means for adjusting the degree of telescoping of said tubes to raise or lower said grill relative to said fire pan.